(12) United States Patent
Imagaki et al.

(10) Patent No.: US 8,096,204 B2
(45) Date of Patent: Jan. 17, 2012

(54) GEAR AND ELECTRIC POWER STEERING DEVICE

(75) Inventors: Susumu Imagaki, Tomdabayashi (JP); Wataru Yamada, Kashiwara (JP); Arata Kikuchi, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 753 days.

(21) Appl. No.: 12/014,591

(22) Filed: Jan. 15, 2008

(65) Prior Publication Data

US 2008/0178697 A1    Jul. 31, 2008

(30) Foreign Application Priority Data

Jan. 26, 2007  (JP) ................................ 2007-016937

(51) Int. Cl.
*F16H 55/12*    (2006.01)
(52) U.S. Cl. ..... 74/446; 74/DIG. 10; 74/425; 74/388 PS
(58) Field of Classification Search .............. 74/DIG. 10, 74/388 PS, 425, 440, 443, 458, 457, 461, 74/446, 449
See application file for complete search history.

(56) References Cited

U.S. PATENT DOCUMENTS

| | | | | |
|---|---|---|---|---|
| 3,591,909 | A | * | 7/1971 | Bebbington et al. ........ 29/893.37 |
| 3,696,685 | A | * | 10/1972 | Lampredi .................... 474/161 |
| 6,003,397 | A | * | 12/1999 | Yasuhira ........................ 74/425 |
| 2002/0056588 | A1 | * | 5/2002 | Kuze et al. .................... 180/444 |

FOREIGN PATENT DOCUMENTS

| | | |
|---|---|---|
| EP | 1 207 095 A2 | 5/2002 |
| EP | 1 327 569 A2 | 7/2003 |
| JP | 2000-329217 | 11/2000 |
| JP | 2001-206230 | 7/2001 |
| JP | 2001-289308 | 10/2001 |
| JP | 2002-145086 | 5/2002 |
| JP | 2003-327143 | 11/2003 |
| JP | 2005-305779 | 11/2005 |

OTHER PUBLICATIONS

Office Action mailed Jul. 12, 2011, in Japanese Patent Application No. 2007-016937, filed Jan. 26, 2007 (with partial English-language translation).

* cited by examiner

*Primary Examiner* — Richard W Ridley
*Assistant Examiner* — Terence Boes
(74) *Attorney, Agent, or Firm* — Oblon, Spivak, McClelland, Maier & Neustadt, L.L.P.

(57) ABSTRACT

A gear includes a metal core and a synthetic resin tooth body. The metal core includes a cylindrical portion, and a disc portion that extends inwardly in a radial direction from one end of the cylindrical portion. The synthetic resin tooth body is coupled to the cylindrical portion of the metal core. A plurality of rotation prevention grooves is formed on the outer peripheral portion of the cylindrical portion, and a plurality of rotation prevention grooves is formed on the inner peripheral portion of the cylindrical portion.

5 Claims, 4 Drawing Sheets

GEAR AND ELECTRIC POWER STEERING DEVICE

INCORPORATION BY REFERENCE

The disclosure of Japanese Patent Application No. 2007-16937 filed on Jan. 26, 2007 including the specification, drawings and abstract is incorporated herein by reference in its entirety.

BACKGROUND OF THE INVENTION

1. Field of the Invention

The invention relates to a gear that is formed by coupling a synthetic resin tooth body to the outer peripheral portion of a metal core, and an electric power steering device that includes the gear.

2. Description of the Related Art

Japanese Patent Application Publication No. 2001-206230 (JP-A-2001-206230) describes an electric power steering device for a vehicle, in which steering torque applied to an input shaft connected to a steering wheel is detected based on the relative rotation of the input shaft and an output shaft that is coaxially connected to the input shaft via a torsion bar, and an electric motor for steering assistance is driven based on, for example, the detected torque. The rotating force of the electric motor is transmitted to steering means via a gear pair. Thus, the operation of the steering means in accordance with the rotation of the steering wheel is assisted using the rotation of the electric motor, and therefore, the steering effort of a driver is reduced.

In the electric power steering device in which the gear pair is used, a gear that includes a synthetic resin tooth body is used to reduce noise caused by engagement of the gear pair.

The gear includes a metal core, and the synthetic resin tooth body that is coupled to the outer peripheral portion of the metal core (refer to JP-A-2001-206230). The metal core may be formed by cutting process, cold forging, or press forming. In the case where the metal core is formed by cutting process or cold forging, a plurality of rotation prevention grooves is formed on the outer peripheral portion of the metal core as shown in FIG. 11 and FIG. 12 of JP-A-2001-206230. In the case where the metal core is formed by press forming, a plurality of rotation prevention grooves and a plurality of through-holes are formed on the outer peripheral portion of the metal core as shown in FIG. 7 of JP-A-2001-206230.

The metal core formed in the above-described manner is placed in an injection mold, and integrally coupled to the synthetic resin tooth body by injection molding. The rotation prevention grooves, or the rotation prevention grooves and the through-holes prevent the relative rotation of the synthetic resin tooth body and the metal core.

However, in the gear that includes the metal core formed by cutting process or cold forging, because the relative rotation of the synthetic resin tooth body and the metal core is prevented only by the rotation prevention grooves formed on the outer peripheral portion of the metal core, the rotation prevention grooves are not sufficiently long, that is, the area where the metal core and the synthetic resin tooth body are coupled to each other is not sufficiently large. Thus, it is desired to increase the coupling strength between the metal core and the synthetic resin tooth body in a rotational direction. In the gear that includes the metal core formed by press forming, because the relative rotation of the synthetic resin tooth body and the metal core is prevented by two means, that is, the rotation prevention grooves and the through-holes formed on the outer peripheral portion of the metal core, the area where the metal core and the synthetic resin tooth body are coupled to each other is sufficiently large. However, the structure for preventing the relative rotation is complicated, and therefore, the structure of a die used to form the metal core is also complicated. Thus, further improvement is required.

SUMMARY OF THE INVENTION

The invention provides a gear and an electric power steering device, in which the area where a metal core and a synthetic resin tooth body are coupled to each other is made sufficiently large without increasing the length of the gear in a tooth-width direction, and the coupling strength between the metal core and the synthetic resin tooth body in a rotational direction is increased, using a simple structure for preventing the relative rotation of the metal core and the synthetic resin tooth body.

A first aspect of the invention relates to a gear that includes a metal core and a synthetic resin tooth body. The metal core includes a cylindrical portion, and a disc portion that extends inwardly in a radial direction from one end of the cylindrical portion. The synthetic resin tooth body is coupled to the cylindrical portion of the metal core. A plurality of rotation prevention grooves is formed on the outer peripheral portion of the cylindrical portion, and a plurality of rotation prevention grooves is formed on the inner peripheral portion of the cylindrical portion.

According to the first aspect, the rotation prevention grooves are formed in the two portions, that is, the outer peripheral portion and the inner peripheral portion of the cylindrical portion. Therefore, the rotation prevention grooves are made sufficiently long without increasing the length of the gear in the tooth-width direction. Thus, it is possible to increase the coupling strength between the metal core and the synthetic resin tooth body in the rotational direction. Further, the rotation prevention grooves are formed on the outer peripheral portion and the inner peripheral portion by cold forging or press forming. Therefore, the structure of the metal core is simple, though the rotation prevention grooves are formed on the outer peripheral portion and the inner peripheral portion of the metal core. This reduces cost.

In the first aspect, the cylindrical portion may include a guard portion that extends outwardly in a radial direction from another end of the cylindrical portion.

With the configuration, the guard portion, which extends outwardly in the radial direction from the other end, is provided in the cylindrical portion. Therefore, when the rotation prevention grooves are formed on the outer peripheral portion by cold forging, the guard portion prevents formation of burrs at the edges of the rotation prevention grooves. This eliminates the process for removing burrs, and prevents occurrence of a crack in the synthetic resin tooth body.

In the above-described aspect, the rotation prevention grooves formed on the outer peripheral portion may extend from the one end to the guard portion. The rotation prevention grooves formed on the inner peripheral portion may extend from the other end to the disc portion.

With this configuration, the rotation prevention grooves formed on the outer peripheral portion and the rotation prevention grooves formed on the inner peripheral portion extend in the tooth-width direction. Therefore, it is possible to sufficiently increase the coupling strength in the rotational direction at both sides of the gear in the tooth-width direction (the one end side and the other end side), though the guard portion is provided. Thus, it is possible to further increase durability even when the gear is used at a location to which relatively high rotational torque is applied.

A second aspect of the invention relates to an electric power steering device that includes an electric motor for steering assistance; a drive gear connected to an output shaft of the electric motor; and the gear according to the first aspect, which engages with the drive gear, and which is connected to steering means. Steering operation is assisted using the rotation of the electric motor.

According to the second aspect, it is possible to sufficiently increase the coupling strength between the metal core and the synthetic resin tooth body in the rotational direction without increasing the length of the gear in the tooth-width direction. Thus, it is possible to increase the durability of the gear, and therefore, the durability of the electric power steering device even when relatively high rotational torque is applied to the gear, for example, by turning a steering wheel while a vehicle is stopped.

BRIEF DESCRIPTION OF THE DRAWINGS

The features and advantages of the present invention will become apparent from the following description of example embodiments, given in conjunction with the accompanying drawings, in which.

DETAILED DESCRIPTION OF EMBODIMENTS

Figure 1:
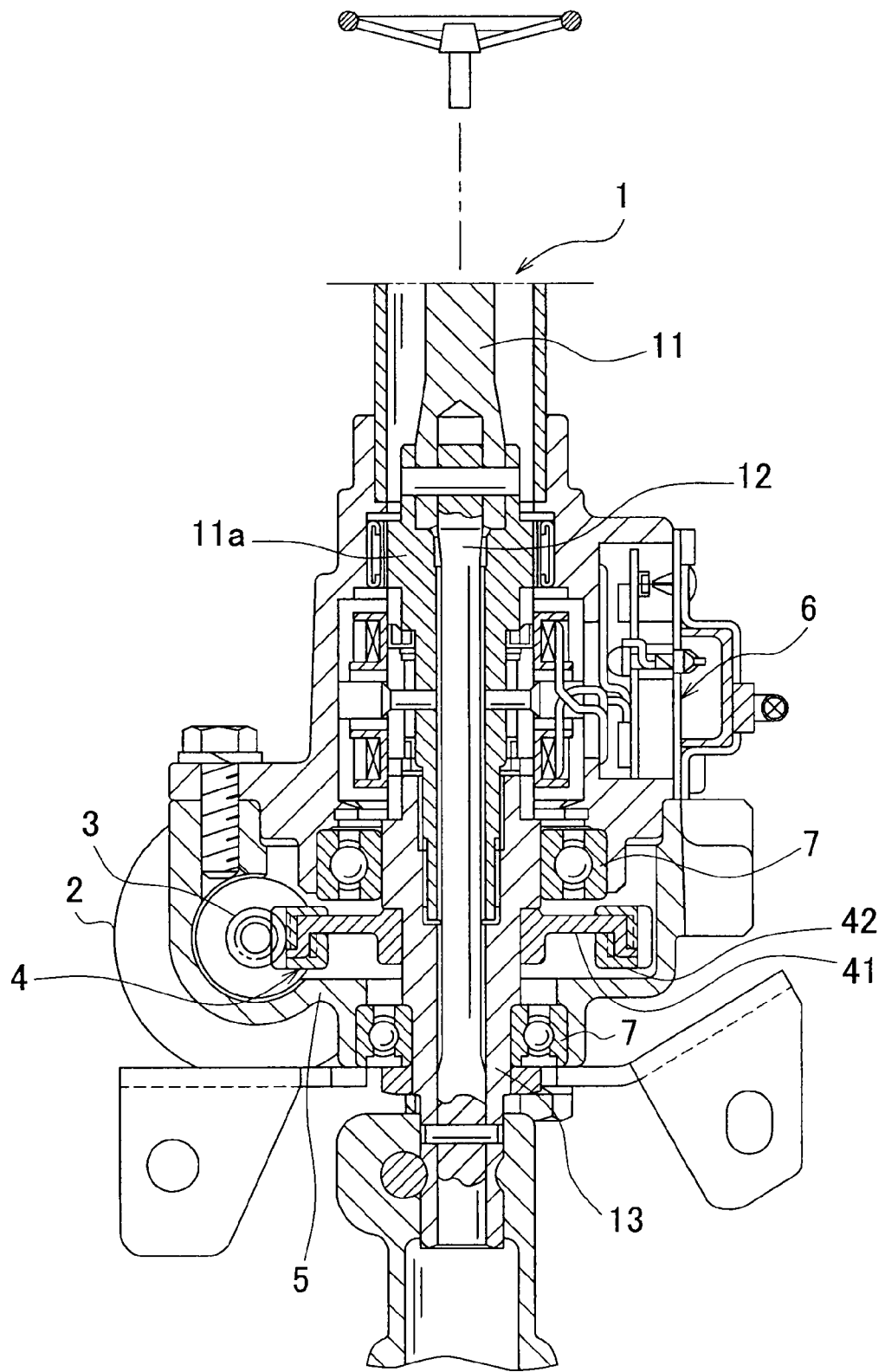
FIG. 1 is a cross sectional view showing the configuration of an electric power steering device according to an embodiment of the invention.

Hereinafter, an embodiment of the invention will be described in detail with reference to the drawings. FIG. 1 is a cross sectional view showing the configuration of an electric power steering device according to the embodiment of the invention. The electric power steering device includes a steering shaft 1, an electric motor 2 for steering assistance, a small gear 3, a large gear 4, a housing 5, and a torque sensor 6. The steering shaft 1, which functions as steering means, is connected to a steering wheel that functions as an operating member. The large gear 4 engages with the small gear 3. The small gear 3 and the large gear 4 increase the rotating force of the electric motor 2, and apply the increased rotating force to the steering shaft 1. The housing 5, which functions as a support member, supports the small gear 3 and the large gear 4 in a manner such that the small gear 3 and the large gear 4 can rotate. The torque sensor 6 detects torque that is applied to the steering shaft 1 according to the operation of the steering wheel. The electric motor 2 is driven based on, for example, the torque detected by the torque sensor 6. The rotating force of the electric motor 2 is transmitted to the steering shaft 1 via the small gear 3 and the large gear 4 to assist steering operation.

The steering shaft 1 includes an upper shaft 11, a torsion bar 12, and a lower shaft 13. The upper portion of the upper shaft 11 is connected to the steering wheel. The torsion bar 12 is coupled to the lower portion of the upper shaft 11. The lower shaft 13 is coupled to the lower portion of the torsion bar 12, and connected to a steering mechanism of, for example, rack-and-pinion type via a universal coupling. The torsion bar 12 is twisted according to steering torque which is based on the operation of the steering wheel and applied to the upper shaft 11 and the lower shaft 13.

A cylindrical portion 11a is coupled to the lower portion of the upper shaft 11. The upper portion of the torsion bar 12 is inserted in the cylindrical portion 11a. The lower shaft 13 is formed to have a cylindrical shape so that the lower portion of the torsion bar 12 and the lower end portion of the cylindrical portion 11a are inserted in the lower shaft 13. The torque sensor 6 is disposed near the lower shaft 13 and the cylindrical portion 11a. The large gear 4 and bearings 7, 7 are fitted to the outer periphery of the lower shaft 13 at certain positions. The bearings 7, 7 support the lower shaft 13 at positions on both sides of the large gear 4.

Figure 2:
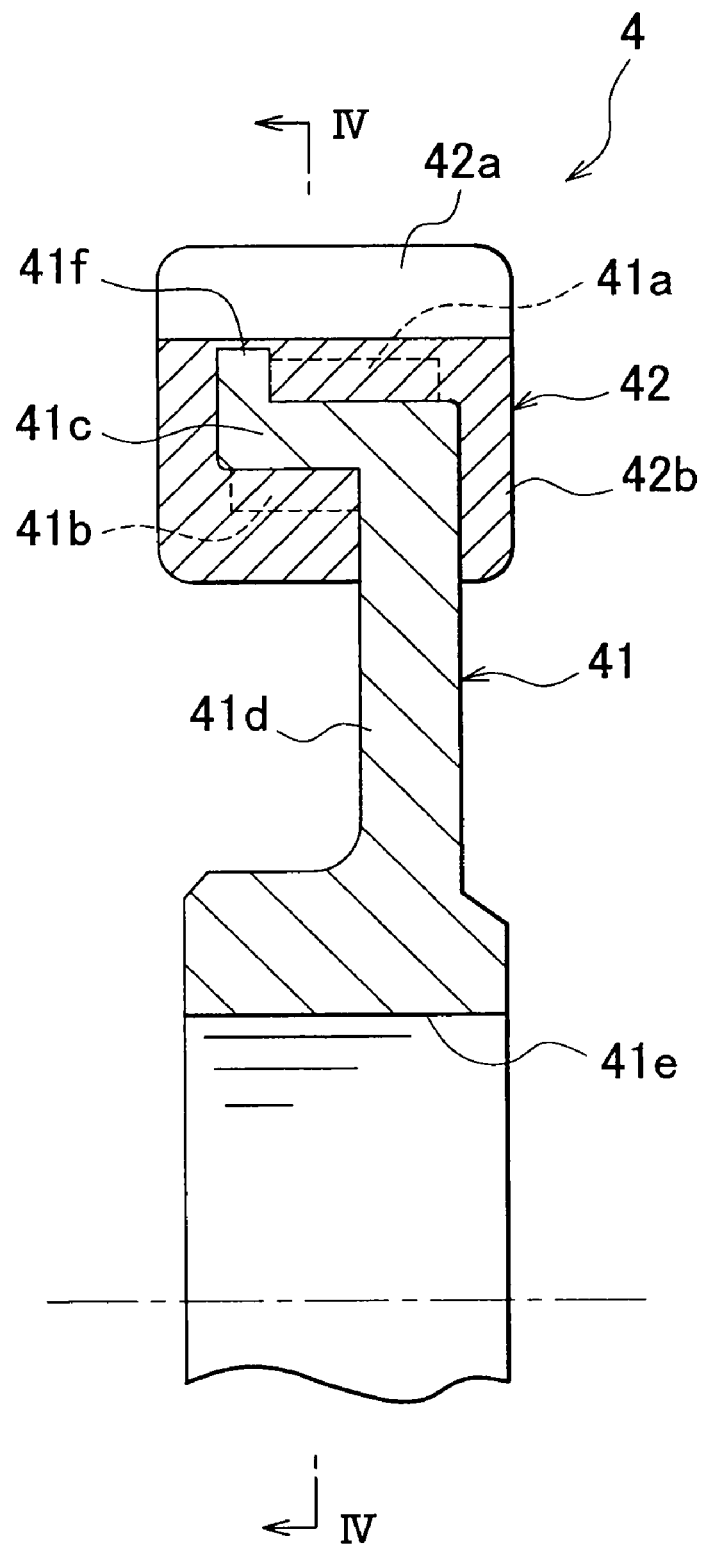
FIG. 2 is an enlarged cross sectional view showing the configuration of a large gear according to the embodiment of the invention.
Figure 3:
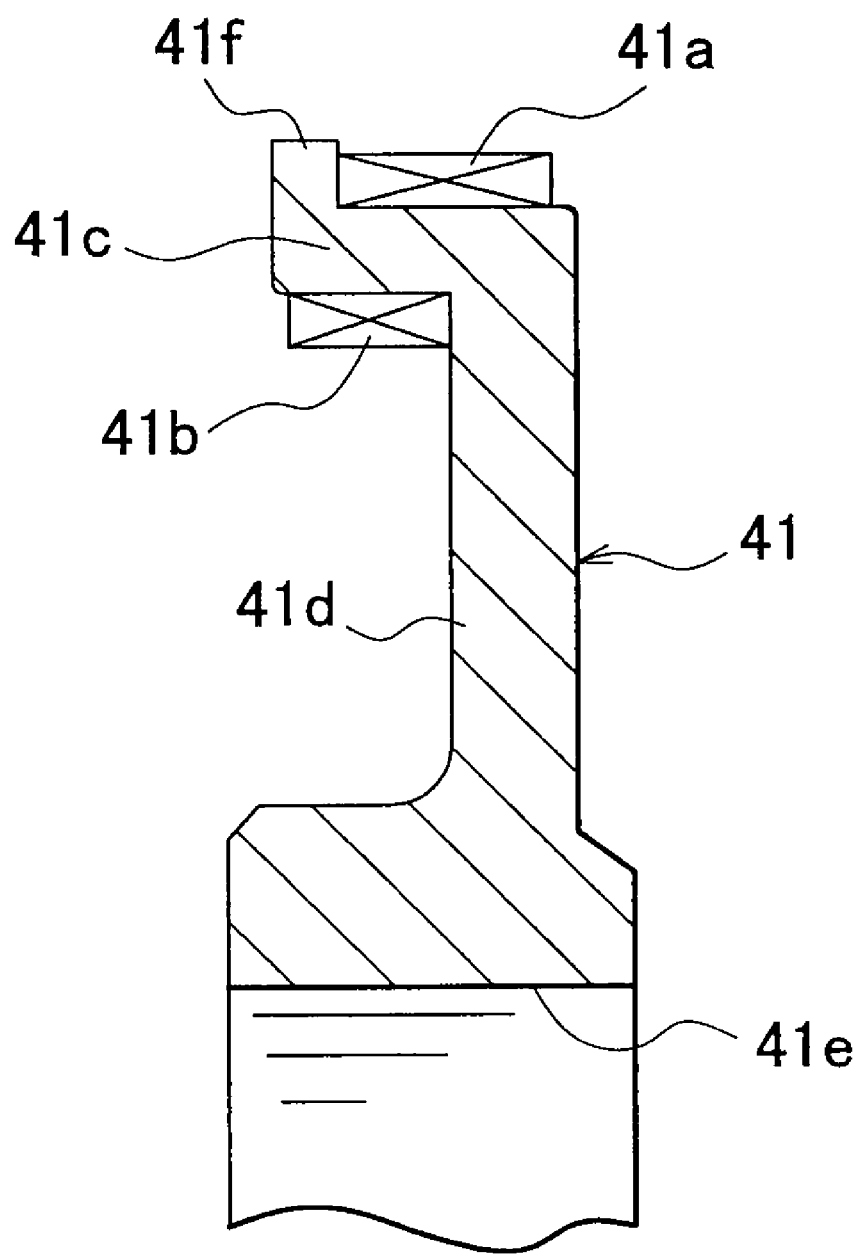
FIG. 3 is a cross sectional view showing the configuration of a metal core of the large gear according to the embodiment of the invention.
Figure 4:
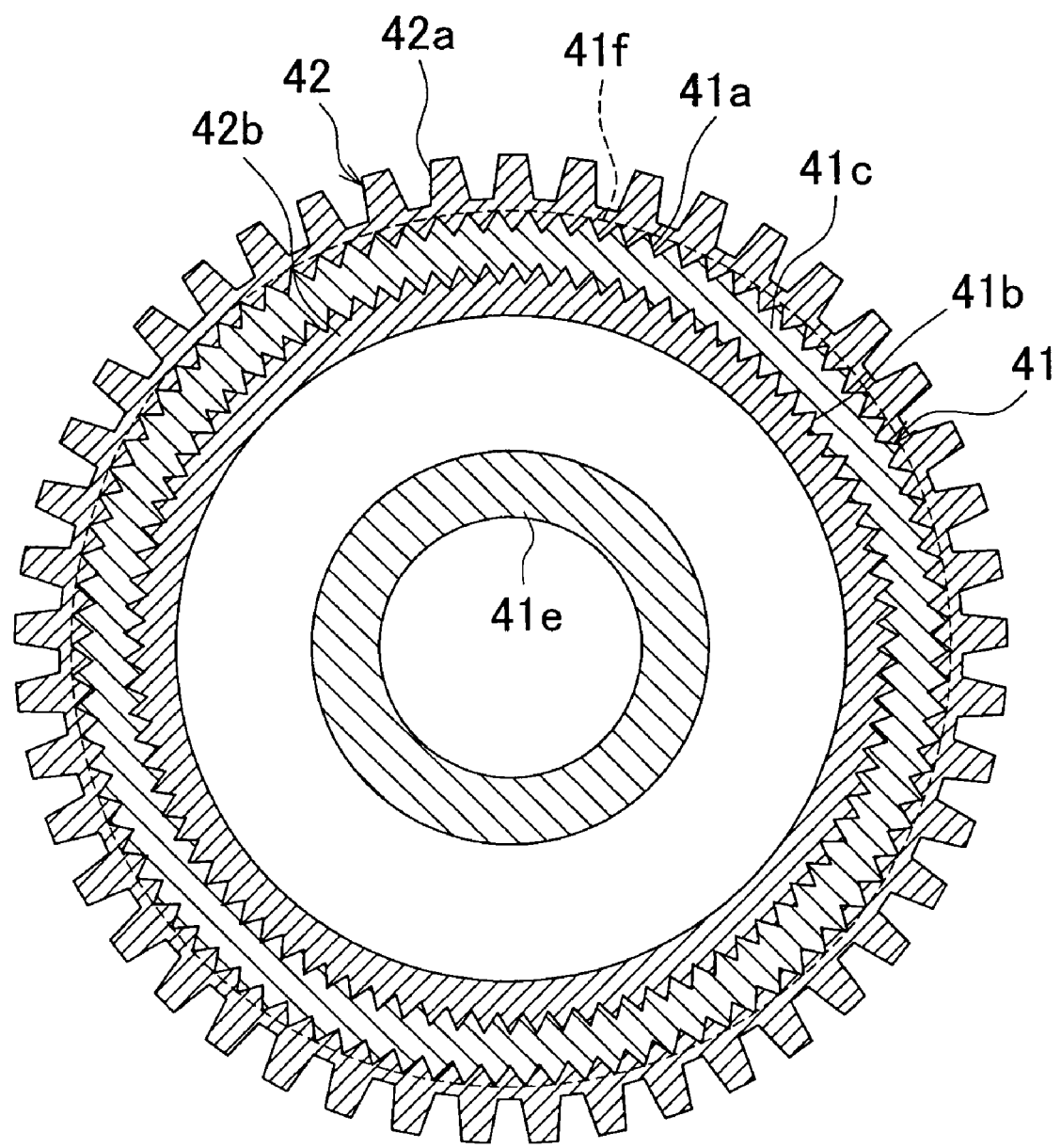
FIG. 4 is a cross sectional view taken along line IV-IV in FIG. 2.

FIG. 2 is an enlarged cross sectional view showing the configuration of the large gear 4. FIG. 3 is a cross sectional view showing the configuration of a metal core 41 of the large gear 4. FIG. 4 is a cross sectional view taken along line IV-IV in FIG. 2. The large gear 4 includes the metal core 41 and a synthetic resin tooth body 42. The metal core 41 includes a cylindrical portion 41c and a disc portion 41d. The cylindrical portion 41c includes a plurality of rotation prevention grooves 41a formed on an outer peripheral portion of the cylindrical portion 41c, and a plurality of rotation prevention grooves 41b formed on an inner peripheral portion of the cylindrical portion 41c. The disc portion 41d extends inwardly in a radial direction from one end of the cylindrical portion 41c. The synthetic resin tooth body 42 is formed integrally with the cylindrical portion 41c. The lower shaft 13 (refer to FIG. 1) is fitted into a fitting hole 41e that is formed in the center portion of the disc portion 41d.

The metal core 41 includes a guard portion 41f that extends outwardly in the radial direction from the other end of the cylindrical portion 41c. The rotation prevention grooves 41a that are formed on the outer peripheral portion of the cylindrical portion 41c to extend from the one end of the cylindrical portion 41c to the guard portion 41f. The rotation prevention grooves 41b that are formed on the inner peripheral portion of the cylindrical portion 41c to extend from the other end of the cylindrical portion 41c to the disc portion 41d. The metal core 41 is formed by cold forging. When the metal core 41 is formed by cold forging, the rotation prevention grooves 41a are formed on the outer peripheral portion of the cylindrical portion 41c to extend from the one end of the cylindrical portion 41c, using an upper die. Because the guard portion 41f is provided in the other end of the cylindrical portion 41c, it is possible to prevent formation of burrs at the edges of the rotation prevention grooves 41a. The rotation grooves 41b are formed on the inner peripheral portion of the cylindrical portion 41c to extend from the other end of the cylindrical portion 41c using a lower die. Because the disc portion 41d is provided at the one end of the cylindrical portion 41c, it is possible to prevent formation of burrs at the edges of the rotation prevention grooves 41b.

The rotation prevention grooves 41a and 41b are formed on the outer peripheral portion and the inner peripheral portion of the cylindrical portion 41c, respectively, in the above-described manner. Thus, the rotational prevention grooves are made relatively long without increasing the length of the large gear 4 in a tooth-width direction. Accordingly, it is possible to increase the coupling strength between the synthetic resin tooth body 42 and the metal core 41 in a rotational direction. Further, it is possible to form, by cold forging, the metal core 41 that includes the rotation prevention grooves 41a and 41b formed on the outer peripheral portion and the inner peripheral portion of the cylindrical portion 41c, respectively.

Therefore, the structure of the metal core 41 is simple. This reduces the cost of production, and therefore, the unit cost of the large gear 4.

The synthetic resin tooth body 42 includes a plurality of teeth 42a, and a ring portion 42b that supports the teeth 42a. The inner portion of the ring portion 42b is coupled to the cylindrical portion 41c. The synthetic resin tooth body 42 is formed by placing the metal core 41 in an injection mold as an insert, and injecting molten synthetic resin, such as nylon resin, into areas outside and inside the cylindrical portion 41c, from the side of the one end of the cylindrical portion 41c. Thus, the synthetic resin tooth body 42 is integrally coupled to the metal core 41.

By forming the synthetic resin tooth body 42, the synthetic resin is filled in the rotation prevention grooves 41a and 41b formed on the outer peripheral portion and the inner peripheral portion of the cylindrical portion 41c, respectively. This prevents the relative movement of the synthetic resin tooth body 42 and the metal core 41 in the rotational direction, and the relative movement of the synthetic resin tooth body 42 and the metal core 41 in the tooth-width direction.

In the electric power steering device thus configured, the rotation of the electric motor 2 for steering assistance is transmitted from the small gear 3 to the lower shaft 13 via the large gear 4. The large gear 4 includes the synthetic resin tooth body 42 that engages with the small gear 3, and the metal core 41 that is coupled to the inner portion of the synthetic resin tooth body 42.

The electric power steering device according to the invention may be configured such that the electric motor 2 is fitted to the lower end portion of the column housing, as shown in FIG. 1. In addition, the electric power steering device according to the invention may be configured such that an electric motor for steering assistance is fitted to a support member that supports a steered shaft whose ends are connected to steered wheels, and the output shaft of the electric motor is disposed in parallel with the steered shaft, and the small gear 3 and the large gear 4 are provided between the output shaft and the steered shaft.

What is claimed is:

1. A gear comprising:
   a metal core comprising a disc portion that extends radially relative to a rotation axis of the gear, and an axially extending cylindrical portion having one axial end connected to a radially outer portion of the disc portion, as well as an other axial end;
   a plurality of rotation prevention grooves formed on a radially outer peripheral portion of the cylindrical portion, and a plurality of rotation prevention grooves formed on a radially inner peripheral portion of the cylindrical portion;
   a synthetic resin tooth body integrally coupled to said cylindrical portion by filling both said plurality of rotation prevention grooves formed on the radially outer peripheral portion of the cylindrical portion, and said plurality of rotation prevention grooves formed on the radially inner peripheral portion of the cylindrical portion, with material of the synthetic resin tooth body; and
   a guard portion that extends outwardly in a radial direction from the other axial end of the cylindrical portion, wherein
   the rotation prevention grooves formed on the outer peripheral portion extend axially from the one axial end to the guard portion and are formed by compression forming,
   the rotation prevention grooves formed on the inner peripheral portion extend axially from the other axial end to the disc portion and are formed by compression forming, and
   the metal core is formed by compression forming.

2. The gear according to claim 1, wherein the metal core is formed by cold forging.

3. An electric power steering device in a steerable vehicle, comprising:
   an electric motor;
   a drive gear connected to an output shaft of the electric motor; and
   the gear according to claim 1, which engages with the drive gear, and which is connected to a steering portion of the vehicle.

4. The gear according to claim 1, wherein:
   the rotation prevention grooves formed on the outer peripheral portion are formed by cold forging; and
   the rotation prevention grooves formed on the inner peripheral portion are formed by cold forging.

5. The gear according to claim 1, wherein the guard portion is formed in the compression forming of the metal core from a piece of material which is common to the guard portion and the metal core.

* * * * *